Dec. 16, 1930.　　　　E. PETERSON　　　　1,784,879
MAGNETIC MODULATOR CIRCUIT
Filed May 22, 1926　　　2 Sheets-Sheet 1
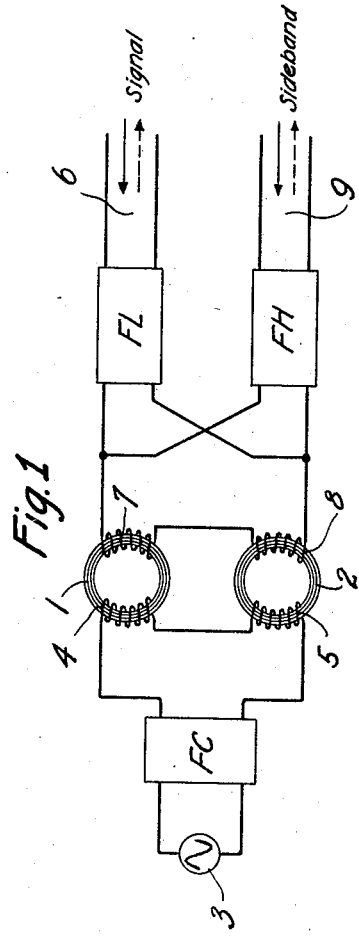
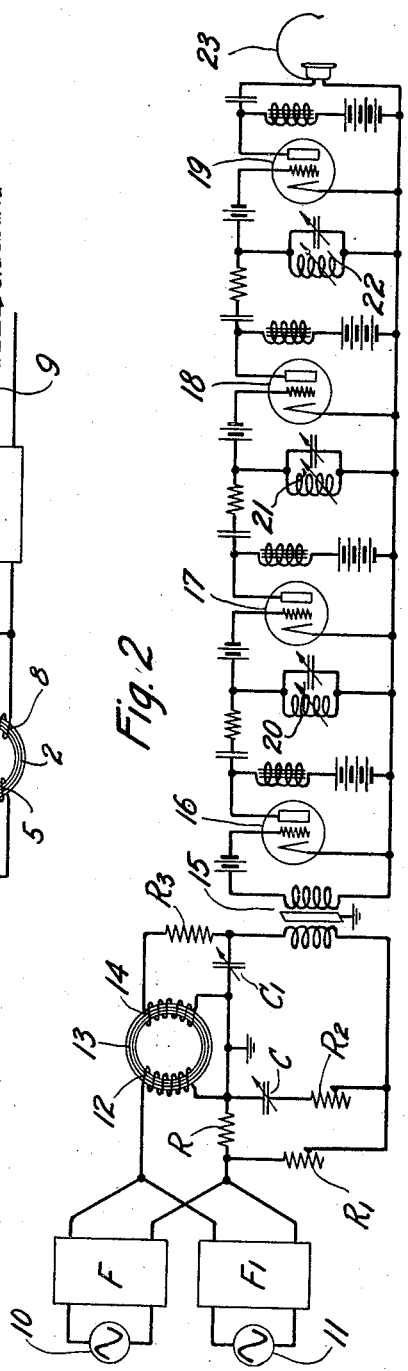
Inventor:
Eugene Peterson
by　J. G. Roberts　Atty.

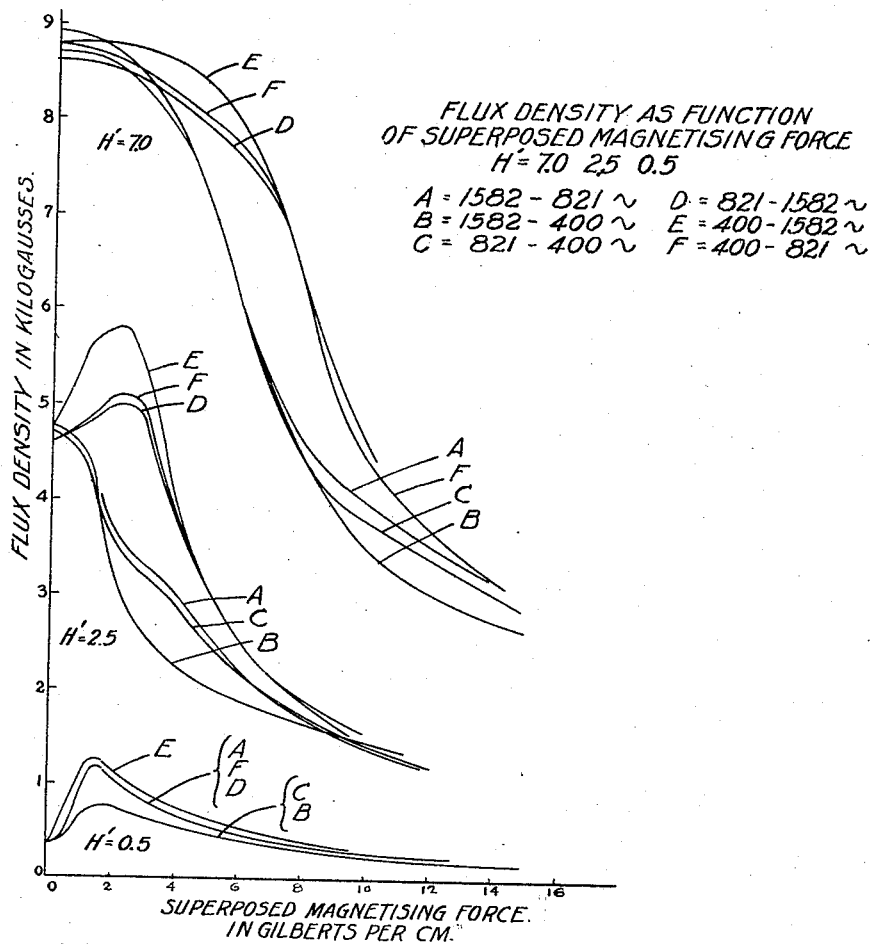

Patented Dec. 16, 1930

1,784,879

UNITED STATES PATENT OFFICE

EUGENE PETERSON, OF NEW YORK, N. Y., ASSIGNOR TO BELL TELEPHONE LABORATORIES, INCORPORATED, OF NEW YORK, N. Y., A CORPORATION OF NEW YORK

MAGNETIC MODULATOR CIRCUIT

Application filed May 22, 1926. Serial No. 110,876.

This invention relates to magnetic modulation circuits having certain special relations of the frequencies and amplitudes of the two waves concerned in the modulating operation. It also relates to testing circuit arrangements for obtaining quantitative data upon which the proper choice of such relations may be based.

The rules governing efficient magnetic modulation require, that there be a maximum transfer of energy from each of two wave sources to the corresponding windings associated with the magnetic element. This necessitates that for both the carrier and modulating current circuits the impedances should be the same looking in either direction from the junction of the input circuit and the magnetizing circuit. It has been found that the impedance of a magnetizing circuit is affected by the superposition of another magnetizing force on the same core. Since the impedance of a magnetizing circuit can be expressed in terms of the flux threading its core and the energy loss in such core, it can equally well be said that the flux and core losses, corresponding to one frequency, are affected when a flux corresponding to a different frequency is simultaneously produced in the core. This principle can be used to insure proper impedance matching in either or both of the circuits of a magnetic modulator under operating conditions.

It is an object of this invention to provide experimental circuits and technique for quantitatively determining the effects on the impedance, corresponding to one frequency due to superposing other magnetizing forces of various other frequencies and amplitudes on the same core.

It is another object of the invention to increase the operating efficiency of a magnetic modulator, by taking account of the increment or decrement of the impedance of the magnetizing circuit at the frequency concerned when a second magnetizing force is superposed on the same core.

In practice it has been found sufficient to accurately match the impedance of the magnetizing circuit with the impedance of the corresponding input circuit only for the modulating frequencies, that is, it has not been found practically necessary to take account of the presence of the superposed magnetizing forces in matching the impedances of the circuits for the carrier frequency.

A still further object of the invention accordingly is to insure the maximum efficiency of modulation as determined by the perfection of the modulating frequency impedance matching.

In general it has been found; that both the flux and core loss, and hence the impedance, increase through a maximum as the superposed magnetizing force is increased regardless of the relative frequency values of the two magnetizing forces; that with two impressed frequencies, and with equal magnetizing forces the flux corresponding to the lower frequency is greater than that corresponding to the higher frequency over at least a large range of magnetizing forces; that there is a similar effect on the core loss; and that each of the above effects is more pronounced as the ratio of frequency is increased.

The invention both as to its theoretical principles and its practical embodiments will be better understood by reference to the following detailed description when considered with the accompanying drawing in which:

Fig. 1 illustrates a typical form of magnetic modulator circuit in which the principle of the invention is embodied.

Fig. 2 illustrates an experimental circuit by means of which the relations that are utilized in the practice of the invention may be determined.

Fig 3 shows in graphical form the results obtained in a typical experiment utilizing the circuit of Fig. 2, whereby the proper proportioning of the elements of a magnetic modulator may be determined in accordance with this invention.

Referring to Fig. 1, modulation takes place by virtue of the superposition of fluxes, corresponding respectively to the carrier and the modulating currents, in magnetic cores 1 and 2. Depending on whether the function is to produce carrier side-bands from the signal waves or to reproduce signal waves from modulated carrier waves, the impressed waves may be of signal or side-band frequencies. The circuit illustrated is adaptable to function as a part of a station of a two-way carrier wave signaling system, using a common means for these two complementary modulating functions.

For each of these functions the carrier wave is supplied from source 3 through filter FC to magnetizing windings 4 and 5 which together constitute the carrier wave magnetizing circuit.

For the first function the signal waves are supplied from circuit source 6 through low-frequency filter FL to magnetizing windings 7 and 8, which constitute the magnetizing circuit for the modulating currents.

For the second function the side-band waves are supplied from circuit source 9 through high frequency filter FH to these same magnetizing windings 7 and 8.

Obviously variations, corresponding to the products of modulation, occur in the flux threading both sets of magnetizing windings and by inductive action appear as potential variations across the terminals of any winding enclosing the flux.

In the specific circuit illustrated in Fig. 1, the windings 7 and 8 function jointly as magnetizing windings and also as windings from which the modulation products are derived. The modulated side-band currents are transferred through filters FL and FH, as the case may be, to circuit 6 or 9. These windings may be connected, respectively, to a telephone substation and to the high-frequency terminal of a two-way carrier wave transmission system.

The circuit illustrated in Fig. 1 could be varied by using a separate generator winding for each of the two units, by combining the functions of the two windings of each unit into a single winding, or by using a parallel, instead of a series, arrangement of the windings.

The function of the filters is to prevent any interaction between the carrier and the other impressed waves, except as it occurs in the modulator proper, and to provide maximum transmission efficiency for the components corresponding to each of the two sets of frequencies. Consistent with the efficient accomplishment of these functions the particular design is immaterial. Examples of filters adapted for this service are disclosed in U. S. Patent 1,227,113, May 22, 1917, to Campbell.

If the filters are each given a mid-series termination, their impedance and frequency characteristics will be satisfactory for use in this circuit. Independence of the circuits carrying these waves is further insured by the use of the two cores and two sets of windings. To this end the relation of windings 4 and 7 is opposite to the relation of windings 5 and 8. The carrier waves, each resulting from magnetic coupling between the winding elements of an individual one of the two sets of windings, 4, 7, or 5, 8 respectively, and the associated core, are therefore balanced out and suppressed with respect to the circuits connected across windings 7 and 8. If carrier suppression is not desired, a single unit can be used. Except for practical reasons governing the mechanical design of the modulator all of these four windings could be wound on a single core.

Modulation results from the operation of the circuit of Fig. 1, by reason of the non-linear flux-magnetizing current (B-H) characteristic. By reason of the symmetry of the B-H loop the even harmonics of the impressed carrier and modulating frequencies, as well as even order side-bands are suppressed. The order is indicated by the sum of the coefficients $m$ and $n$ in the general expression for modulated side-band frequencies $mp \pm nq$ in which $p$ represents the carrier and $q$ the signal. That is, only odd order side-bands, of which those of the third order are usually the most pronounced, will result from the use of the specific circuits of Fig. 1.

Although not necessary for a complete statement of the invention, the following information may be useful in designing a magnetic modulator, especially one utilizing higher order modulation, adapted to operate in accordance with the principles of the invention.

The purpose is to obtain as large a flux variation as possible from a given magnetizing current variation. This may be accomplished in part by using as large magnetizing forces as possible, i. e., with a given magnetizing current constant by feeding through a relatively large number of turns. The number of turns permissible, however, is limited, since the inductance increases as the square of the number of turns, while the magnetizing force increases linearly, and hence the magnetizing force will tend to be decreased, due to increase of impedance for the magnetizing current. To further increase the flux and therefore the magnitude of the flux changes, the core should be closed; the magnetic path should be short, the core material should have high permeability, and the core cross-section should be large. But as the cross-sectional area increases, the inductance tends to increase and therefore serves to limit the cross-section area which can be used. These practical considerations have resulted, in systems actually constructed, in the choice of a toroidal shaped core having a diameter of an order of a fraction of an inch, and the use of windings the number of turns of which are of the order of 1000.

If means were used to produce a biasing magnetizing force or flux in a circuit similar to that of Fig. 1, even order side-bands could be produced.

The general mathematical theory of modulation together with various applications to magnetic modulation circuits, somewhat similar to that of Fig. 1, is disclosed in applicant's copending U. S. application 683,301, filed December 29, 1923, Patent No. 1,678,163, July 24, 1928.

The invention described in this specification is entirely independent of the particular order of modulation eventually utilized.

The rules governing efficient utilization of transmission circuits require that the input circuits through which the carrier and modulating waves are supplied, each matches as closely as possible the impedance of the corresponding magnetizing windings.

It is more important to accomplish this matching with reference to the modulating waves than with reference to the carrier waves, since the carrier source can be made oversize so as to provide for any imperfection in matching, without very much increase in cost; whereas a similar result could only be accomplished, for the modulating waves derived from a microphone source, by introducing additional apparatus such as amplifiers which tend to materially increase the cost. Of course, where a common magnetizing circuit is used for such widely different modulating frequencies, a choice has to be made between the signal and incoming side-band waves in the design of an efficient magnetic circuit, or a compromise made between the two sets of desired conditions.

Since the impedance of a magnetizing circuit to current of any frequency is partly determined by the characteristics of the magnetizing current which superposes its influence on the common core, it is an object of the invention to determine the order of these effects and to apply this knowledge to the design of the circuits associated with the magnetic modulator.

Fig. 2 illustrates a circuit by means of which these effects may be investigated.

For simplicity of control the carrier and modulating waves of Fig. 1 are simulated by sine waves of two different frequencies, generated by sources 10 and 11. The waves from these sources are impressed on magnetizing winding 12 of a magnetic modulator, which includes a core 13 and a generator winding 14. If desired, separate magnetizing windings may be used for the two impressed currents, as in Fig. 1.

In an investigation of the kind here considered, although the conditions relating to the elements 12, 13 and 14 must simulate those of a magnetic modulator, it is important that there be no flow of side-band current in the magnetizing winding. This is for at least two reasons, (1) it would complicate the problem by changing conditions in the core in a manner which is unknown, and hence render it impossible to accurately measure the desired values and (2) since the sources of fundamental frequencies are also the prime sources of the side-band energy, this energy would appear as an effective resistance in the fundamental frequency circuits; and hence the apparent resistance of the magnetizing circuit would depend not only on the iron itself, but also on the impedance presented to the side-band products by the connecting circuit. Similar considerations govern in the case of the flux density. Accordingly the test circuit arrangement must include means for suppressing the side-band products with respect to the magnetizing circuit.

Suppression is effected by means of filters F and $F_1$. These filters may be of simple construction, for example, of the type disclosed in the Campbell patent referred to above. As in the cases of filters FL and FH, each of filters F and $F_1$ should terminate in series branches; to insure that the impedance of the combined circuit will be very high to all except the selected frequencies. Each must be able to transfer energy from its related source with slight attenuation and to offer a high impedance to frequencies outside this range, particularly to side-band frequencies. Depending on the narrowness of the transmission range of the two filters the side-band suppression is more or less complete.

The method of using the above described magnetic modulator circuit for the desired quantitative determinations is based on the balancing of two voltages, one proportional to the flux and differing from it in phase, the other proportional to the magnetizing force and differing from it in phase.

A voltage proportional to the magnetizing force in winding 12 is obtained across the resistance R connected in series with the winding. Since it is desired, among other things, to measure the effect of superposing a magnetizing current of a certain amplitude relative to the other magnetizing current, the amplitude of the current through the magnetizing winding should not vary during the adjustments necessary to effect the balance. This condition is complied with by using the potentiometer impedance comprising variable resistances $R_1$ and $R_2$ and variable condenser C, the voltage across $R_2$ and C, which supply the balancing voltage, being proportional to the current in resistance R and the magnetizing winding, when R is made small as compared with the sum of the resistances $R_1$ and $R_2$.

A voltage proportional to the flux is obtained across variable condenser $C_1$ which is in series with the generator winding 14 and resistance $R_3$.

It may be shown mathematically that the voltage across condenser $C_1$ is proportional to the flux produced by the magnetizing current, if the resistance of $R_3$ is large as compared with the combined impedance of the condenser and the winding 14.

Besides the condition just stated the impedance of the circuit connected to winding 14, as a whole, must be large as compared with the impedance of the circuit connected to the magnetizing winding; in order to prevent the flow of current in the former circuit from reacting on the flux so as to change its value from that determined by the magnetizing current. Also the coupling factor of the two windings must be as close to unity as possible, in order that the flux threading the two windings may be the same. A separate generator winding, such as 14, is used instead of the winding 12, in order that the energy loss to be measured may not include the resistance losses in the circuits associated with the magnetizing circuits.

It is desirable that the eddy current loss also be kept as small as possible in order that the magnetization of the core may be uniform throughout the cross-section and, therefore, that the magnetic condition of the core may be more definite. This determines the choice of core material and the type of laminations. The core should be closed so as to avoid any indefiniteness due to the demagnetizing action of air gaps, or to the effects of stray fields. The number of turns in the magnetizing winding is determined by the currents available from the two sources. Under practical conditions this usually necessitates a magnetizing winding having a large number of turns per unit length. In order that the potential necessary to obtain the desired magnetizing current may not be too great the inductance should be made as small as possible; as by making the core of small diameter. The leakage flux is kept small by superposing the two windings, and by having alternate layers of the magnetizing winding wound with a negative pitch so as to avoid the production of a transverse magnetizing force.

When a balance is obtained, the following equations can be used, without correction, to determine the values of the flux and core loss corresponding to either of the two frequencies:

$$B = \frac{C_1 R I}{nA} 10^5 \left[ \frac{\left(R_3^2 + \frac{1}{(2\pi f)^2 C_1^2}\right)\left(R_2^2 + \frac{1}{(2\pi f)^2 C^2}\right)}{(R + R_2 + R_1)^2 + \frac{1}{(2\pi f)^2 C^2}} \right]^{1/2}$$

$$\theta = \cot^{-1} 2\pi f C (R + R_2 + R_1) - \cot^{-1} 2 f \pi C R_2 - \cot^{-1} 2\pi f C_1 R_3$$

$$W_f = \frac{B_f H_f \sin \theta_k}{4}$$

in which; B is the maximum flux density in kilogausses or kilomaxwells per square centimeter cross-section of the core; H is the maximum magnetizing force in gilberts per centimeter; n is the number of turns in the generator winding; A is the cross-section of the core in square centimeters; I is the magnetizing current; $\theta$ is the phase angle of B referred to H; and $W_f$ is the energy loss in ergs per cycle per cubic centimeter of core material for a frequency $f$.

The circuits at the right of transformer 15, are for the purpose of selecting the desired impressed frequency, to the exclusion of the other and of the side-band frequencies which might obscure the balance, and to determine the condition of balance by zero indication for the selected frequency.

This selection and elimination is accomplished by the series of electric discharge amplifiers 16, 17, 18 and 19 and the associated tuned circuits 20, 21 and 22. The first amplifier, since its input potentials have not been subject to selection to eliminate the components that might cause inter-modulation, should be oversize.

An experimental procedure that has proved successful is as follows:

The original magnetizing current is successively fixed at various values through a range including the value corresponding to the maximum permeability.

For each of such values, balance is obtained and the flux and core loss corresponding to the original magnetizing current computed for a variety of relations of original and superposed currents, the frequency of the superposed current being chosen so as to be both greater and less than that of the original current. For each pair of original and superposed currents the magnetizing force for the superposed current is varied through a sufficient range to insure inclusion of the significant values of the relations to be determined. These relations, which can be conveniently expressed by curves are, for each of the original magnetizing forces, the original-flux-superposed-magnetizing-force for each relation of frequencies, as shown in Fig. 3, and the core-loss-superposed-magnetizing-force for each such relation of frequencies.

In a particular experimental procedure successfully used by applicant in which a silicon steel core was used, the original magnetizing force, symbolized in Fig. 3 by H′, was successively fixed at .5, 1.4, 2.5, 4.4, 7 and 10 gilberts. For each of these values experimental runs were made with a superposed magnetizing force of from about 0 to 15 gilberts. Three frequencies were used, namely, 400, 821 and 1582 cycles. All possible combinations of these frequencies were used and a run was made for each pair of frequencies. One frequency of each pair was considered the original frequency, corresponding to the values to be measured, and the other the superposed frequency. The above noted frequencies were chosen so as to avoid possible complications, due to the presence of combination frequencies coincident with one of the two impressed frequencies.

In interpreting the data obtained, the relations involving the changes of flux, due to the superposed magnetizing force will first be considered. It should be remembered that the permeability is the ratio of the flux density to the magnetizing force and that permeability is a factor of the inductance, and hence of the impedance, of the magnetizing circuit.

For each fixed original magnetizing force, and for each relation of the two frequencies, the flux corresponding to the original magnetizing force was found to increase through a maximum as the superposed magnetizing force was increased, this effect being more pronounced at the lower fixed values of original magnetizing force. The flux, when the superposed magnetizing force was high, became nearly constant at a value much lower than the flux when no magnetizing force was superposed. This relative decrease is more pronounced as the value of the fixed magnetizing force is increased. The maxima for the various curves occur at substantially the same value of superposed magnetizing force.

By comparison of any two pairs of curves corresponding to interchanged values of the original and superposed frequencies it was found that the curve, when the original frequency was the lower of the two, had a higher maximum than when it was the higher of the two. This, with the other comparisons above made, demonstrates that when two frequencies producing equal magnetizing forces are used, the flux corresponding to each frequency may be increased, over a range of magnetizing forces including the peak values, by the presence of other frequencies, but that the flux density corresponding to the lower frequency will be the greater of the two. This relation of fluxes persists even at the higher values of superposed magnetizing forces, where there is a decrease rather than an increase of each flux.

When all of the curves were compared as a whole, it was found that all of the curves throughout the range of superposed magnetizing forces were ordered in accordance with ratio frequencies. That is, the highest maximum was reached when there was the greatest ratio (1582 to 400 cycles) of superposed and original frequency, and that the lowest maximum was reached when this ratio was least (400 to 1582 cycles). The peaks of all the curves were comprised in about the same range of superposed magnetizing forces, so that the peaks varied in sharpness similarly to the above described ordering.

As was to be expected, since the permeability with only the original frequency impressed should not vary materially with the frequency, the curves corresponding to different frequency relations, but with the same original magnetizing force, started from about the same point. For the fixed values of original magnetizing forces selected, there was a maximum permeability, without a superposed frequency, at about 2.5 gilberts. This permeability was of the order of 2000. Since the increase in permeability for a given magnetizing force as affected by a superposed magnetizing force became relatively greater as the fixed magnetizing forces became smaller, this increase was just about enough, for the values of the original magnetizing forces below 2.5 gilberts per centimeter to keep the maximum permeability, for the best ratio of frequencies, from falling below this value of 2000. Of course for fixed values above 2.5 the compensating principle is inoperative and the effect of superposition is insufficient to make the maximum permeability as great as for the optimum value 2000, for the single frequency.

The effects of superposition, on core loss, were generally in agreement with the above noted effects. The maxima were found, in general, at somewhat lower superposed magnetizing forces. The effect of frequency ratio was less definite, but was in general in agreement. There was a distinct separation of the group of curves corresponding, respectively, to the cases where the superposed frequencies were higher than and lower than the original frequencies, but the curves in each group were less definitely ordered. For large superposed magnetizing forces, that is, in the region outside of the peaks, the order of the two groups of curves tended to be inverted, so that the partition of core loss between the two imput frequencies depends decidedly on the superposed magnetizing force. The effects were somewhat masked by the displacement of the curves due to eddy current at the higher values of magnetizing forces, but the same conclusions are justified, if these effects are corrected.

As in the analogous case of the flux, core loss at high superposed magnetizing forces, except for the lowest values of the fixed magnetizing forces, became less than when no magnetizing force was superposed. This phenomenon is known as hysteresis suppression. It finds a ready explanation in the shifting, by the superposed magnetizing force, of the magnetization loop corresponding to the original magnetizing force to a region of small energy loss which exists along the more nearly saturated parts of the superposed magnetization characteristic.

It has been shown above how to determine the increments and decrements of the impedance of a magnetizing circuit due to the presence of a superposed magnetizing force and, accordingly, how to adjust the impedance of the connected circuit so that proper matching may exist during the actual operation of the modulator. It has also been indicated qualitatively what the effect of superposition may be expected to be, so that one skilled in the art may make an approximately correct adjustment of the impedance matching without recourse to such an experimental procedure. As a matter of fact the effects are so pronounced that a distinctly more perfect matching may be secured, even using this qualitative data, than may be secured by merely insuring a matching, however perfect, when there is no superposition.

While this invention has been disclosed as embodied in a particular form, it is obvious that it is capable of embodiment in other and different forms without departing from the spirit and scope of the invention as defined in the appended claims.

What is claimed is:

1. A transmission system comprising a source of currents having one or more frequencies in a definite range, a source of currents having a frequency outside of said range, a magnetic device, and means for applying currents from said sources to said device, the impedances of said first source and of said device being matched so as to cause approximately the maximum transfer of energy therebetween when currents from said second source are supplied to said device.

2. A transmission system comprising a source of currents, a source of currents of a different frequency characteristic, a magnetic device, and magnetizing circuit means for magnetizing said device in accordance with the currents from said sources, the impedance of at least one of said sources and said magnetizing circuit means being matched so as to cause approximately the maximum transfer of energy therebetween when currents from both of said sources are being applied to said magnetizing circuit means.

3. A transmission system comprising a source of currents, a source of currents of a different frequency characteristic, a magnetic core, and magnetizing circuit means for magnetizing said core in accordance with the currents from said sources, the impedance of at least one of said sources with relation to the impedance of said magnetizing circuit means, when currents from only that source are applied thereto, being caused to differ by such an amount from the impedance of said magnetizing circuit means that when said last mentioned impedance is changed by the superposition of a magnetizing force from the other source, such impedances will be matched so as to cause approximately the maximum transfer of energy therebetween.

4. A magnetic modulator comprising a magnetic core structure, a magnetizing circuit means therefor, and two input circuits, the impedance of at least one of said input circuits being such that there is approximately perfect matching between it and said magnetizing circuit means when currents from both of said input circuits are impressed upon said magnetizing circuit means.

5. A transmission system comprising a magnetic core, magnetizing circuit means therefor, and two input circuits, the impedance of at least one of said input circuits being such that energy is transferred therefrom to said magnetizing circuit means more efficiently when current from the other input circuit is being impressed on said means, than when current from the other input circuit is not being so impressed.

6. A transmission system comprising a magnetic core, an input circuit, a magnetizing circuit for said core connected to said input circuit, a second input circuit, and a second magnetizing circuit for said core connected to said second input circuit, the impedance of at least one of said input circuits being adjusted so that there is a maximum transfer of energy to its connected magnetizing circuit when magnetizing forces are impressed on said core from both of said magnetizing circuits.

7. The system of claim 4 in which one input circuit is a source of multi-frequency modulating currents and in which the other input circuit is a source of carrier currents.

8. The system of claim 4 in which one of said input circuits is a source of multi-frequency modulating currents and in which the other input circuit is a source of carrier currents, said adjustment of impedance being with respect to the input circuit which is a source of modulating currents.

9. The system of claim 6 in which one input circuit is a source of multi-frequency modulating currents and in which the other input circuit is a source of carrier currents.

10. The system of claim 6 in which one of said input circuits is a source of multi-frequency modulating currents and in which the other input circuit is a source of carrier currents, said adjustment of impedance being with respect to the input circuit which is a source of modulating currents.

In witness whereof, I hereunto subscribe my name this 21st day of May, A. D. 1926.

EUGENE PETERSON.